United States Patent
Albrecht

(10) Patent No.: US 9,852,777 B2
(45) Date of Patent: Dec. 26, 2017

(54) HERMETICALLY-SEALED HARD DISK DRIVE COVER PERIMETER ADHESIVE SEAL

(71) Applicant: HGST Netherlands B.V., Amsterdam (NL)

(72) Inventor: Thomas R. Albrecht, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/046,250

(22) Filed: Feb. 17, 2016

(65) Prior Publication Data

US 2017/0236557 A1    Aug. 17, 2017

(51) Int. Cl.
*G11B 33/14*    (2006.01)
*G11B 33/02*    (2006.01)

(52) U.S. Cl.
CPC ........ *G11B 33/1466* (2013.01); *G11B 33/027* (2013.01)

(58) Field of Classification Search
CPC .......................... G11B 33/1466; G11B 33/027
USPC ................................ 360/99.19, 99.2, 99.21
See application file for complete search history.

(56) References Cited

U.S. PATENT DOCUMENTS

| | | | |
|---|---|---|---|
| 5,084,123 A | | 1/1992 | Curtis |
| 5,233,491 A * | | 8/1993 | Kadonaga ........... G11B 33/1466 360/99.18 |
| 5,454,157 A * | | 10/1995 | Ananth ................ G11B 33/121 29/467 |
| 5,600,509 A * | | 2/1997 | Kawakami ........... G11B 33/121 360/97.21 |
| 5,793,566 A * | | 8/1998 | Scura ................. G11B 33/1466 360/99.18 |
| 6,226,143 B1 * | | 5/2001 | Stefanksy ............ G11B 5/5526 360/99.2 |
| 6,266,207 B1 * | | 7/2001 | Iwahara ................. G11B 33/08 360/99.18 |

(Continued)

OTHER PUBLICATIONS

S. Fujio et al., Hard Disk Drive Enclosure Sealing for Electromagnetic Noise Immunity, IP.com Prior Art Database, Driginal Publication Date: Jun. 1, 1994 in IBM Technical Disclosure Bulletin vol. 37 No. 06A, Included in the Prior Art Database: Mar. 27, 2005, IP.com Disclosure No. IPCOM000112786D, IBM, US.

(Continued)

*Primary Examiner* — Brian Miller
(74) *Attorney, Agent, or Firm* — John D. Henkhaus

(57) ABSTRACT

A hermetically-sealed hard disk drive (HDD) involves the inner surfaces of sidewalls of a second cover overlapping with and adhesively bonded with the outermost surfaces of sidewalls of an enclosure base. Matching angled sidewalls for the inner and outermost surfaces, and an adhesive bond that provides a hermetic seal in which a ratio of the height to the thickness of the adhesive bond is in a range of 50-100:1, may be utilized to provide a hermetic seal having a long, narrow diffusion path to inhibit diffusion of gas through the adhesive bond. The second cover may include preformed corner corrugations, and the base may include corner pockets in which corner pleats, formed with the corner corrugations by bending inward the cover sidewalls, are received within when the cover and base are bonded together.

24 Claims, 8 Drawing Sheets

(56) References Cited

U.S. PATENT DOCUMENTS

| | | | |
|---|---|---|---|
| 6,271,985 B1* | 8/2001 | Ishikawa | G11B 23/38 360/99.18 |
| 6,525,899 B2 | 2/2003 | Hearn et al. | |
| 6,693,767 B1* | 2/2004 | Butler | G11B 25/043 360/97.13 |
| 6,721,128 B1* | 4/2004 | Koizumi | G11B 33/1466 360/99.21 |
| 6,762,909 B2* | 7/2004 | Albrecht | G11B 5/6005 360/236.3 |
| 6,820,272 B2* | 11/2004 | Wang | G11B 33/022 369/77.11 |
| 7,119,984 B2 | 10/2006 | Macleod et al. | |
| 7,218,473 B2 | 5/2007 | Bernett et al. | |
| 7,362,541 B2 | 4/2008 | Bernett et al. | |
| 7,522,375 B2* | 4/2009 | Tsuda | G11B 25/043 360/99.21 |
| 7,692,891 B2 | 4/2010 | Hatchett et al. | |
| 7,876,528 B2 | 1/2011 | Uefune et al. | |
| 7,957,092 B2* | 6/2011 | Ichikawa | G11B 25/043 360/99.2 |
| 8,094,408 B2 | 1/2012 | Uefune et al. | |
| 8,205,220 B2* | 6/2012 | Kim | G11B 17/056 720/601 |
| 8,279,552 B2 | 10/2012 | Stipe | |
| 8,451,559 B1* | 5/2013 | Berding | G11B 25/043 360/99.21 |
| 8,533,934 B2 | 9/2013 | McGuire, Jr. et al. | |
| 8,659,849 B2 | 2/2014 | Hayakawa et al. | |
| 8,753,093 B2 | 6/2014 | Liotta | |
| 8,854,766 B1* | 10/2014 | Gustafson | G11B 33/1486 360/97.12 |
| 9,147,436 B2* | 9/2015 | Watson | G11B 33/02 |
| 2003/0081348 A1* | 5/2003 | Watanabe | G11B 33/08 360/97.19 |
| 2005/0094312 A1* | 5/2005 | Sato | G11B 5/5521 360/99.13 |
| 2006/0002005 A1* | 1/2006 | Miyazaki | G11B 33/124 360/99.23 |
| 2006/0034010 A1* | 2/2006 | Abe | G11B 33/1466 360/99.21 |
| 2007/0035872 A1* | 2/2007 | Hayakawa | G11B 33/1466 360/99.21 |
| 2007/0171567 A1* | 7/2007 | Choi | G11B 33/1446 360/97.16 |
| 2007/0177308 A1* | 8/2007 | Kimura | G11B 25/043 360/245.9 |
| 2007/0183085 A1* | 8/2007 | Hatchett | G11B 25/043 360/99.21 |
| 2009/0241322 A1* | 10/2009 | Uefune | G11B 25/043 29/603.01 |
| 2011/0212281 A1* | 9/2011 | Jacoby | G11B 25/043 428/35.8 |
| 2012/0275287 A1* | 11/2012 | McGuire, Jr. | G11B 25/043 369/75.11 |
| 2014/0301043 A1* | 10/2014 | Onishi | H05K 9/006 361/728 |

OTHER PUBLICATIONS

S. Fujio et al., Hard Disk Drive Enclosure Sealing for Electromagnetic Noise Immunity, IP.com Prior Art Database, Original Publication Date: Jun. 1, 1994 in IBM Technical Disclosure Bulletin vol. 37 No. 06A, Included in the Prior Art Database: Mar. 27, 2005, IP.com Disclosure No. IPCOM000112786D, IBM, US.

Top cover sealing structure, The IP.com Prior Art Database, Jan. 23, 2014, 4 pages, IPCOM000234620D, ip.com, downloaded from https://priorart.ip.com/IPCOM/000234620.

Thomas R. Albrecht et al., Adhesive Cover Seal for Hermetically-Sealed Data Storage Device, U.S. Appl. No. 15/168,766, filed May 31, 2016.

Thomas R. Albrecht et al., Adhesive Cover Seal for Hermetically-Sealed Data Storage Device, U.S. Appl. No. 15/169,018, filed May 31, 2016.

Thomas R. Albrecht et al., Adhesive Cover Seal for Hermetically-Sealed Data Storage Device, U.S. Appl. No. 15/168,895, filed May 31, 2016.

Thomas R. Albrecht et al., Hermetically-Sealed Data Storage Device for Increased Disk Diameter, U.S. Appl. No. 15/189,998, filed Jun. 22, 2016.

* cited by examiner

HERMETICALLY-SEALED HARD DISK DRIVE COVER PERIMETER ADHESIVE SEAL

FIELD OF EMBODIMENTS

Embodiments of the invention may relate generally to hard disk drives and more particularly to use of a cover perimeter adhesive seal for hermetically sealing a hard disk drive.

BACKGROUND

A hard-disk drive (HDD) is a non-volatile storage device that is housed in a protective enclosure and stores digitally encoded data on one or more circular disk having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

HDDs are being manufactured which are hermetically sealed with helium inside. Further, other gases that are lighter than air have been contemplated for use as a replacement for air in sealed HDDs. There are various benefits to sealing and operating an HDD in helium ambient, for example, because the density of helium is one-seventh that of air. Hence, operating an HDD in helium reduces the drag force acting on the spinning disk stack, and the mechanical power used by the disk spindle motor is substantially reduced. Further, operating in helium reduces the flutter of the disks and the suspension, allowing for disks to be placed closer together and increasing the areal density (a measure of the quantity of information bits that can be stored on a given area of disk surface) by enabling a smaller, narrower data track pitch. The lower shear forces and more efficient thermal conduction of helium also mean the HDD will run cooler and will emit less acoustic noise. The reliability of the HDD is also increased due to low humidity, less sensitivity to altitude and external pressure variations, and the absence of corrosive gases or contaminants.

Electronic systems that require hermetically sealed internal volume (e.g., a lighter-than-air gas filled, sealed HDD) need a way of preventing the occurrence of leakage through the interface between the cover and the corresponding enclosure base to which the cover is coupled. One approach is to utilize two covers, one being the typical HDD cover coupled to the base with fasteners (a "first cover") but not hermetically-sealed, with another cover (a "second cover") being welded to the base over the first cover, such as by laser welding. However, sealing approaches involving laser welding secondary covers to the base are a relatively costly process in the context of mass production of HDDs.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are generally directed at a hard disk drive (HDD) in which the inner surfaces of a plurality of sidewalls of a second cover overlap with and are adhesively bonded with the outermost surfaces of a plurality of sidewalls of an enclosure base, and methods for sealing such an HDD. Embodiments include matching angled sidewalls for the inner and outermost surfaces, and an adhesive bond that provides a hermetic seal in which a ratio of the height to the thickness of the adhesive bond is in a range of 50-100:1, thereby providing a hermetic seal having a long, narrow diffusion path to inhibit diffusion of gas through the adhesive bond.

Embodiments include a second cover that includes a plurality of preformed corner corrugations and a base that includes a plurality of corner pockets in which cover corner pleats, formed with the corner corrugations by bending inward the cover sidewalls, are disposed within when the cover and base are bonded together.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 5C-1 is a cross-sectional partial side view illustrating the HDD assembly of FIG. 5C, according to an embodiment;

FIG. 5D-1 is a cross-sectional partial side view illustrating the HDD assembly of FIG. 5D, according to an embodiment.

DETAILED DESCRIPTION

Approaches to an adhesive seal for a hermetically-sealed hard disk drive are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a hermetic seal for a hard disk drive (HDD) storage device. Thus, in accordance with an embodiment, a plan view illustrating an HDD 100 is shown in FIG. 1 to illustrate an exemplary operating context.

Figure 1:
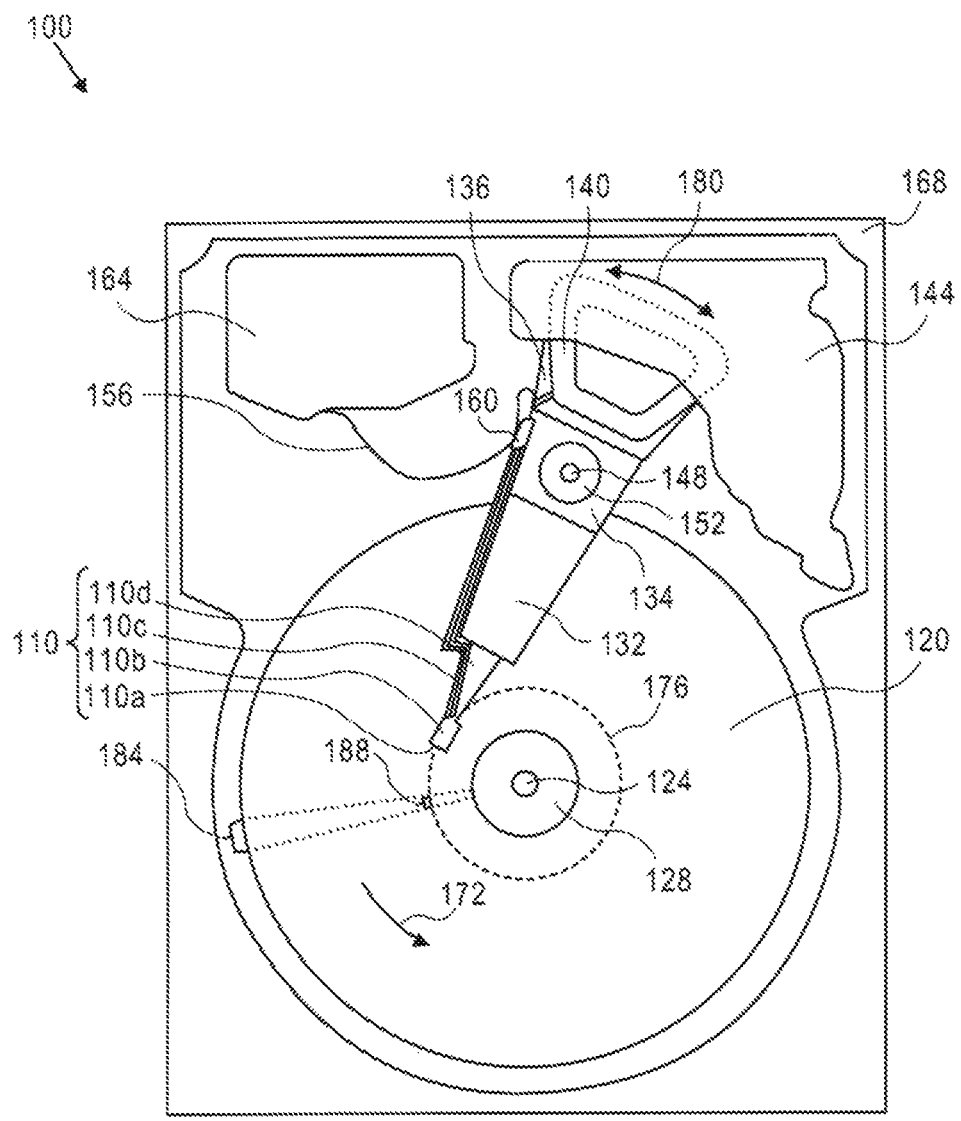
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

INTRODUCTION

The term "hermetic" will be understood to describe a sealing arrangement designed to have nominally no (or negligible) gaseous leakage or permeation paths. While terms such as "hermetic", "negligible leakage", "no leakage", etc. may be used herein, note that such a system would often still have a certain amount of permeability and, therefore, not be absolutely leak-free. Hence, the concept of a desired or target "leak rate" may be used herein.

Recall that electronic systems that require a hermetically sealed internal volume (e.g., a lighter-than-air gas filled, sealed HDD) need a way of preventing the occurrence of leakage through the cover-to-base interface, with one approach being to utilize two covers, the second of which may be laser welded to the base over the first cover.

Consider for example that a 3.5" form factor HDD has an enclosure perimeter approximately 500 mm long. If a simple flat metal cover is attached to the tops of the vertical sidewalls of a tub-style base, the width of the joint might typically be around 1 mm, or perhaps 2 mm at most. The sidewalls of the base are typically 5 mm thick or less, to provide room for internal components. In particular, the regions where the sidewalls pass by the OD of the disk stack must be especially thin (at most 3 mm thick) simply because of the size of the disks (e.g., 95 mm diameter), the width of the form factor (101.6 mm) and provisioning for minimal clearance between the base sidewalls and the rotating disks. Furthermore, the full width of a sidewall generally cannot be used to create a sealing face for the cover. The assembly process for sealed drives may involve first attaching an inner cover with a preliminary gasket seal, followed by servo-writing and manufacturing test (which has imperfect yield, so performing these while the second cover is not in place allows reworkability), followed by attaching a hermetically-sealed second cover (after second cover attachment, the drive is no longer reworkable because the second cover seal/attachment is not reversible). Because the preliminary gasket seal of the first cover generally requires some sidewall top face width to achieve a seal, the amount of remaining sidewall top face width is reduced to around only 1 mm or less at the narrowest points next to the outer diameter of the disks.

While laser welding of the second cover to the base can successfully create a permanent hermetic seal with very little top face width on the base sidewall, laser welding is a relatively expensive process. A lower cost approach than laser welding, for joining and sealing the cover-to-base interface, may be to use an epoxy adhesive. However, even the best epoxy materials have a fairly high permeability to helium and other low-density gases. Thus, providing a joint geometry that reduces the leak rate to an acceptable level is noteworthy.

Adhesive Seal for Hermetically-Sealed Hard Disk Drive

Achieving a low enough leak rate for a cover seal using epoxy generally may or should involve the following considerations, according to embodiments: (a) a low permeability epoxy adhesive, such as alumina-filled H72 epoxy from Epoxy Technology (EpoTek); (b) the bond line thickness (or "width") between the cover and the base is very thin, e.g., around 0.1 mm or less; and (c) the height (i.e., the overlap region between the cover and the base) of the seal is long, e.g., around 5-10 mm or more.

The need for a long seal [e.g., (c) above] provides a challenge to achieving an adequate seal with a simple horizontal bond line between a thin base sidewall and a cover. Although reducing the height of the bond could be compensated for by reducing the thickness of the bond, consistently achieving such a thin bond line would rely on exceptionally good surface finish (low roughness) on the mating surfaces and very small or no filler particles within the epoxy (which, however, are useful for achieving low permeability of the epoxy in the first place). However, achieving a bond line having a thickness of approximately 0.05-0.1 mm is thought to be achievable with typical machined surfaces and commercially available epoxy.

Tub Cover on Tub Base, with Sloping Interface Surfaces

An approach to sealing a hard disk drive (HDD), according to an embodiment, involves the use of an adhesive seal around the perimeter of an HDD cover-to-base interface. Hence, a lighter-than-air (e.g., He, $N_2$) gas-filled HDD may comprise a cover sealed to the base with an epoxy joint designed to achieve an acceptably low leak rate, where a low leak rate may be achieved by using a joint which has substantial vertical overlap between the cover and base such that the bond cross section is very narrow and the diffusion path length is relatively long (e.g., at least a few mm). According to embodiments, a long, narrow diffusion path is achieved by using a vertical or slightly sloped bond line around the perimeter of the cover-to-base interface. The base may be characterized as a "tub design", and the cover may also be characterized as an inverted "tub design" (both due to their tub-like shape, having walls extending from a relatively planar surface), such that the rim of the cover fits tightly over the outer wall of the base with substantial vertical overlap. Herein, the "height" of the adhesive cover-to-base joint is used to describe the overlap length of the joint, e.g., the length along the interface, which roughly corresponds to the amount of vertical or near-vertical overlap between the corresponding cover and base sidewalls.

Figure 2A:
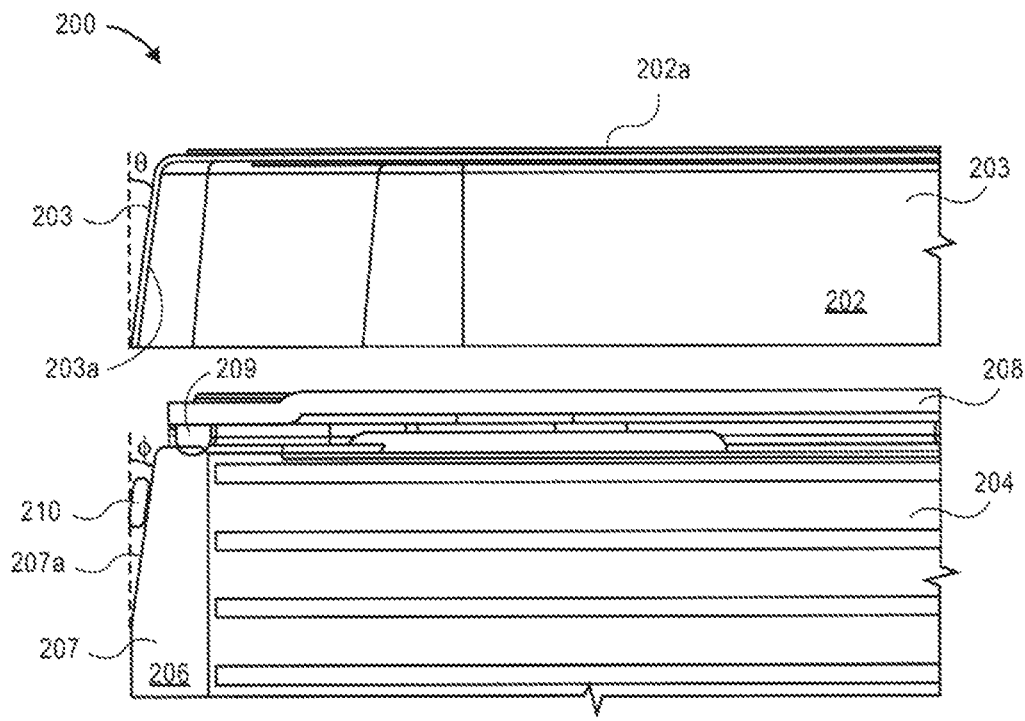
FIG. 2A is an exploded cross-sectional partial side view illustrating an HDD assembly, according to an embodiment.
Figure 2B:
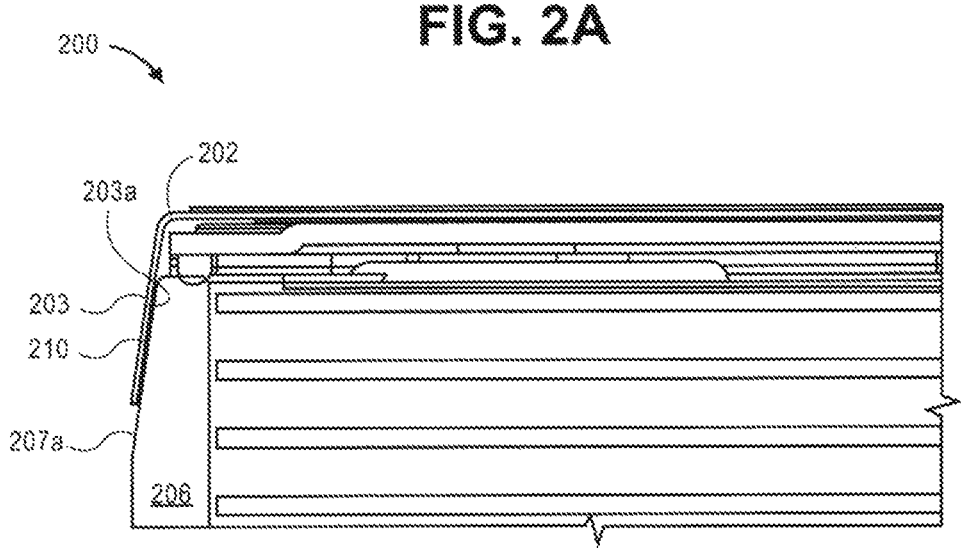
FIG. 2B is a cross-sectional partial side view illustrating the HDD assembly of FIG. 2A, according to an embodiment.

FIG. 2A is an exploded cross-sectional partial side view illustrating an HDD assembly, and FIG. 2B is a cross-sectional partial side view illustrating the HDD assembly of FIG. 2A, both according to an embodiment.

FIGS. 2A, 2B illustrate an HDD assembly 200 comprising a cover 202 and an HDD 204 comprising an enclosure base 206. Each of the cover 202 and the base 206 comprise a plurality of sidewalls, cover sidewall(s) 203 and base sidewall(s) 207, respectively. Each cover sidewall 203 extends from a top portion 202a of the cover 202, and comprises an inner surface 203a. Similarly, each base sidewall 207 comprises an outermost surface 207a.

As discussed, one approach to preventing leakage across the cover-to-base interface is to utilize two covers, an outer cover positioned over an inner cover. Hence, the HDD 204 comprises a first cover 208 attached to the base 206, such as by fasteners, with a gasket seal 209 therebetween. Recall that the assembly process for a sealed drive may involve attaching an inner first cover (such as first cover 208) to a base (such as base 206) with a preliminary gasket seal (such as gasket seal 209) therebetween. The foregoing is then typically followed by servo-writing and manufacturing test followed by attaching a hermetically-sealed outer cover, such as cover 202. The first cover 208 may be characterized as a "conventional" cover and, similarly, the HDD 204 may be a "conventional" HDD. By contrast, a "hermetically-sealed HDD assembly" (or simply a "sealed HDD"), such as HDD assembly 200, further comprises the cover 202 that is hermetically-sealed to the base 206. Therefore, hereinafter cover 202 may be referred to as "second cover 202".

As illustrated in FIG. 2B, when the second cover 202 is positioned for mating and bonding with the base 206, at least a portion of each cover sidewall 203 overlaps with at least a portion of each base sidewall 207. In such a position, the outermost surface 207a of each base sidewall 207 is in a bond mating position with the corresponding inner surface 203a of each cover sidewall 203. Hence, an adhesive 210, such as an epoxy, can be dispensed on or applied to the outermost surface 207a of each base sidewall 207, to the inner surface 203a of each cover sidewall 203, or to both surfaces, i.e., around the perimeter of the cover 202 and/or base 206. Hence, pushing the cover 202 firmly down onto the base 206 spreads the adhesive 210 over the full or nearly full extent of the mating surfaces (i.e., inner surface 203a and outermost surface 207a) and creates a perimeter tension along the inner surface 203a of sidewalls 203 of the cover 202, holding the cover sidewalls 203 tight against the outermost surface 207a of sidewalls 207 of the base 206. Along long straight sections of the joint, this perimeter tension may be less effective in keeping the cover 202 sidewalls 203 and the base 206 sidewalls 207 tightly pressed together. Thus, a clamping force may be beneficial during curing of the adhesive 210 to keep the bond line thin (for a non-limiting example, below 0.1 mm thickness).

To achieve a long (roughly vertical direction) bond line (i.e., one which has substantial vertical overlap between the cover 202 and the base 206), a steep angle (close to vertical) is preferred on the mating surfaces, inner surface 203a and outermost surface 207a. That is, if a shallower slope were used (for example, a 45 degree slope), the extent of vertical overlap would be greatly reduced, and the desired bond height (for a non-limiting example, around 5 mm or more) may not be achieved. On the other hand, if the angle is too close to vertical, there is very little clearance between the cover 202 sidewall 203 rim and the top of the base 206 sidewall 207 as the cover 202 is lowered onto the base 206. If the clearance is too small, and there is insufficient control of cover 202 dimensional tolerances and positioning tolerances during assembly, the sidewall 203 of cover 202 may interfere with the sidewall 207 of base 206 as it is lowered thereon. Such interference could cause manufacturing errors, mishaps, and delays. For example, the sidewall 203 of cover 202 may contact the top of the sidewall 207 of base 206, preventing assembly entirely; or the sidewall 203 of cover 202 may contact the side of the sidewall 207 of base 206 prematurely, scraping adhesive 210 out of position on the base 206, cover 202, or both. In the foregoing case of undesirably scraping adhesive 210, insufficient epoxy may remain in the joint area thereby creating voids in the joint, which may cause the gas leak rate to be unacceptably high. It is not necessary that such a void create an open leak path from inside the drive to the outside to cause a leak problem. Rather, the mere presence of bubbles or voids can make the effective height of the joint too small, thereby allowing gas diffusion (i.e., leakage) through the remaining epoxy to be unacceptably high.

According to an embodiment, at least one outermost surface 207a of the sidewall 207 of the base 206 is fabricated at an angle Φ from the vertical direction, and at least one inner surface 203a of the sidewall 203 of the cover 202 is fabricated at an angle θ from the vertical direction. Therefore, the likelihood of interference between the cover 202 and the base 206, and of associated manufacturing errors, is reduced or minimized. According to a related embodiment, every outermost surface 207a of the sidewall 207 of the base 206 is fabricated at an angle Φ from the vertical direction and every inner surface 203a of the sidewall 203 of the cover 202 is fabricated at an angle θ from the vertical direction.

According to an embodiment, the two angles, θ and Φ, are roughly or approximately equal and lie in a range of 5-35 degrees from the vertical. For a non-limiting example, an inclined inner surface 203a associated with the sidewall 203 of the cover 202 may be fabricated by a metal drawing process with an aluminum sheet metal cover, and an inclined outermost surface 207a associated with the sidewall 207 of the base 206 may be cast right into a base 206 casting. A slope in the range of 5-35 degrees includes a useful range of values that provide sufficient vertical overlap for a long joint and at least some clearance so that a tightly controlled cover manufacturing process and cover-to-base sealing process can have acceptable yield.

It is noted throughout that a low leak rate may be achieved by using a joint which has substantial overlap between the cover and base such that the bond cross section is very narrow and the diffusion path length (based on what is referred to herein as the "height" of the adhesive bond because of its relation to the vertical direction) is relatively long. Furthermore, it is noted that to achieve a long bond line, a steep angle is preferred on the mating surfaces, inner surface 203a and outermost surface 207a. Thus, if one were to measure the dimensions of a cross-section of the adhesive bond between the cover 202 and the base 206, i.e., between the inner surface 203a of the sidewall 203 and the outermost surface 207a of the sidewall 207, cut in a plane normal to the pair of sidewalls 203a, 207a, a "narrow" cross-sectional area is preferred. According to an embodiment, the adhesive bond between the cover 202 and the base 206 created using the adhesive 210, is such that a ratio between the height (roughly vertical direction) and the thickness (roughly horizontal direction) lies in a range of 50:1-100:1 (or 50-100:1). Hence, an adhesive bond having the foregoing dimensional ratio is likely to provide a hermetic seal between the cover 202 and the base 206 that has a long diffusion path for inhibiting diffusion of gas through the adhesive bond. For a non-limiting example, a sufficiently effective adhesive bond, allowing an acceptable gas leak rate therethrough, may have a thickness of around 100 µm and a height of around 5-10 mm.

Tub Cover on Tub Base, with Preformed Corner Features

With respect to the foregoing described embodiments, the manufacturing and assembly tolerances can be relaxed by a variation in design and assembly process. Rather than utilizing a small slope in the overlap region to generate some lateral clearance between the cover and base walls, according to an embodiment, the angles (e.g., θ and θ of FIG. 2A) of the cover sidewalls and the base sidewalls, respectively, are not equal but are designed such that the cover sidewalls slope outward relative to the base sidewalls in the pre-assembly state. A configuration in which the angles differ provides clearance between the cover sidewalls and the base sidewalls. After such a cover is seated on the base, the cover sidewalls can be bent inward by applying inward pressure with a suitable tool and holding the cover sidewalls against the base sidewalls until the adhesive is cured, to hold things permanently in place.

Figure 3A:
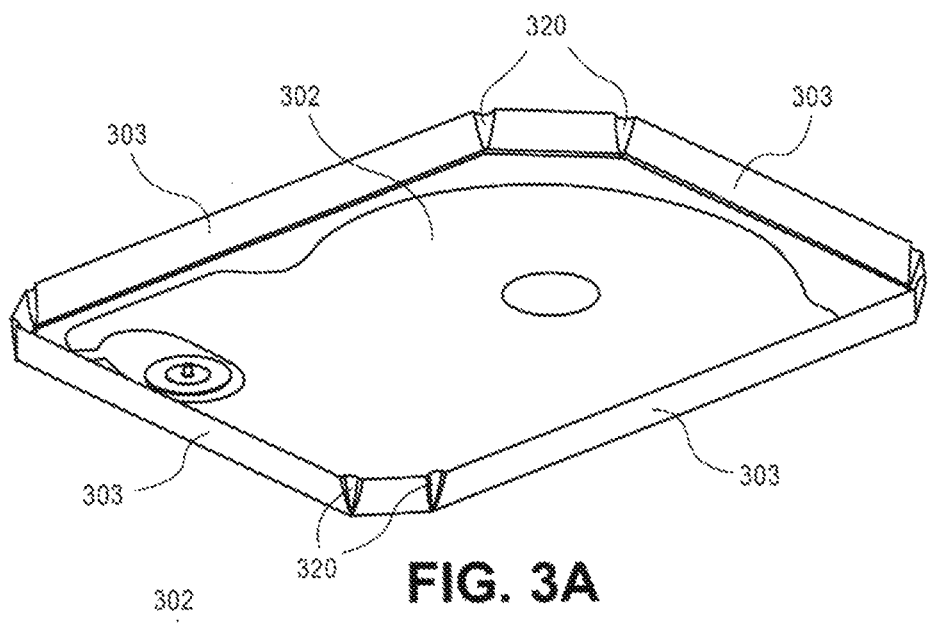
FIG. 3A is a perspective view illustrating an HDD secondary cover, according to an embodiment.
Figure 3B:
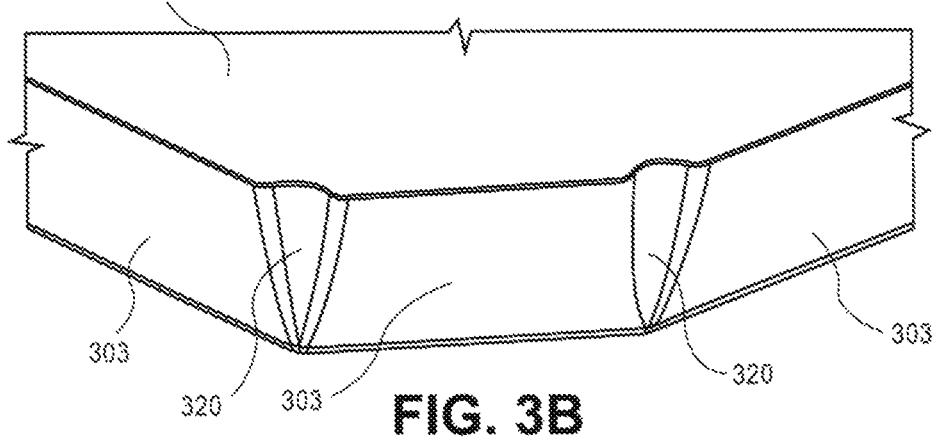
FIG. 3B is a perspective view illustrating a corner of the HDD secondary cover of FIG. 3A, according to an embodiment.
Figure 3C:
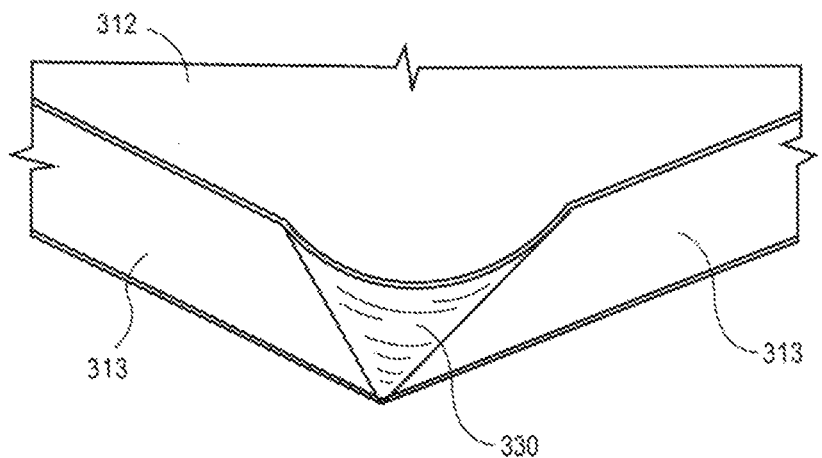
FIG. 3C is a perspective view illustrating a convex corner of an HDD secondary cover, according to an embodiment.
Figure 4A:
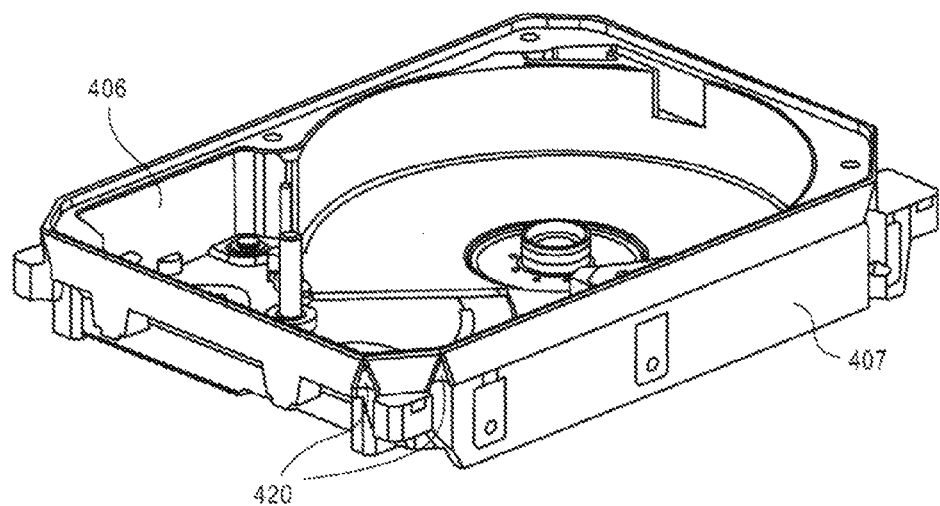
FIG. 4A is a perspective view illustrating an HDD enclosure base, according to an embodiment.

Of particular concern during the cover sidewall fold-in process is what to do with the excess perimeter of the cover sidewall due to the sloped sidewalls. That is, by forming the cover sidewalls with a slope that is more outward than the base sidewalls, there is excess perimeter material on the cover. FIG. 3A is a perspective view illustrating an HDD secondary cover, and FIG. 3B is a perspective view illustrating a corner of the HDD secondary cover of FIG. 3A, both according to an embodiment. FIG. 3C is a perspective view illustrating a convex corner of an HDD secondary cover, according to an embodiment. FIG. 4A is a perspective view illustrating an HDD enclosure base, and FIG. 4B is a perspective view illustrating a corner of the HDD enclosure base of FIG. 4A, both according to an embodiment.

For the following description, reference is made to FIGS. 3A-4B. FIGS. 3A, 3B depict a cover 302 that comprises a plurality of preformed corner corrugations 320. According to an embodiment, the corner corrugations 320 are positioned between substantially outward sloping sidewalls 303 of the cover 302. According to embodiments, the corner corrugations 320 may be concave (as depicted) or may be convex, or may even be a combination of concave and convex. FIG. 3C depicts a cover 312 that comprises a plurality of convex corners 330 having increasing radii in a direction away from the top portion (e.g., top portion 202a of FIG. 2A), and positioned between substantially outward sloping sidewalls 313 of the cover 312.

Figure 4B:
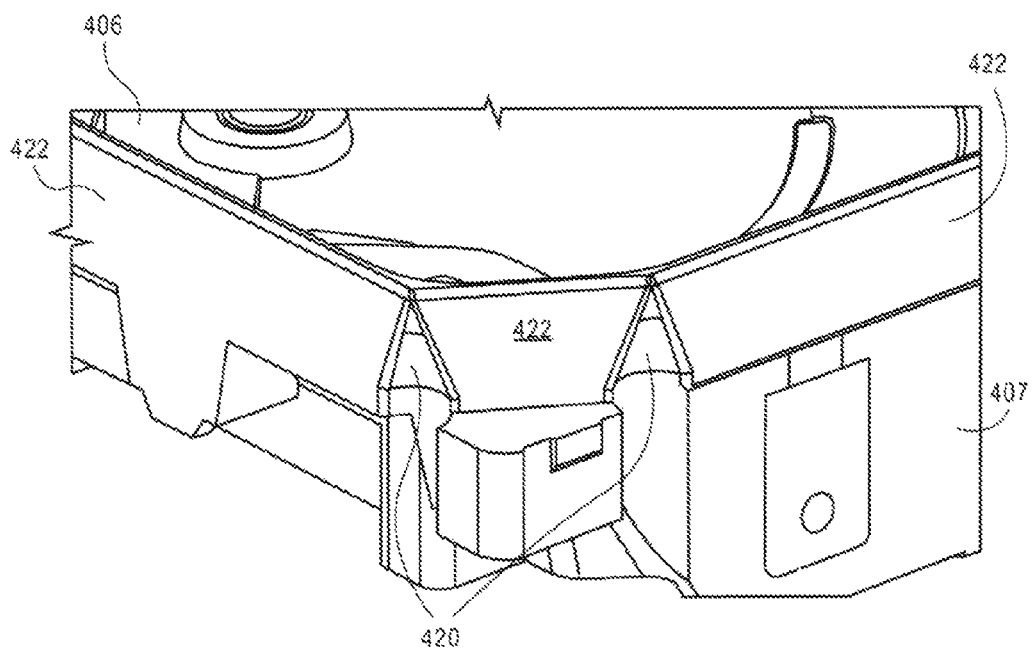
FIG. 4B is a perspective view illustrating a corner of the HDD enclosure base of FIG. 4A, according to an embodiment.

FIGS. 4A, 4B depict a base 406 that comprises a plurality of sidewalls 407 and a plurality of corner pockets 420. According to an embodiment, the corner pockets 420 are positioned between substantially vertical faces 422 of the sidewalls 407 of the base 406. The corner corrugations 320 are such that they form what may be characterized as pleats when the sidewalls 303 are folded inward. Thus, the excess perimeter material of the cover 302 can be taken up into, received by, or disposed in, the corner pockets 420 of the base 406. Similarly, the convex corners 330 are such that corresponding pleats can be formed when the sidewalls 313 are folded inward, whereby the excess perimeter material of the cover 312 can be taken up into, received by, or disposed in, the corner pockets 420 of the base 406. The shape of the corner pockets 420 of the base 406 may vary from implementation to implementation. However, according to an embodiment, the corner pockets 420 are conical-shaped, as conical pockets work well in providing an available volume that corresponds to the cover 302 material that needs to be accounted for and taken up. The amount of material to be taken up increases with distance from the apex, hence, the conical shape provides volume proportional to what is needed with increasing distance from the apex. According to another embodiment, the corner pockets 420 may be pyramidal, which would also serve to provide suitable volume for the cover 302 material needing to be taken up.

Note that with this embodiment, the adhesive (e.g., adhesive 210) can be applied either before placing the cover 302 on the base 406, or after placing the cover 302 on the base 406, because the differing slopes provide open access to the joint area prior to bending sidewalls 303 of the cover 302 inward. Applying adhesive after placing the cover 302 on the base 406 may be advantageous because the wedge-shaped gap between the cover 302 and the base 406 provides a good geometry for using capillary flow to bring a liquid adhesive to the apex of the joint, which is a good position for the adhesive to spread evenly throughout the joint during the cover 302 sidewall 303 fold-in process. Applying the adhesive after the cover 302 has been placed on the base also may minimize the chance of the adhesive contaminating other surfaces during the assembly process.

It is preferable that any folds or pleats within the cover 302 material that is disposed in the corner pockets 420 of the base 406 be filled with adhesive during and after the sidewall 303 fold-in process. Applying sufficient adhesive near the apex of the corner pockets 420 after the cover 302 has been placed over the base 406 should allow for pleats to be filled with adhesive and to seal well. Although the effective bond line thickness in these corner pockets 420 may exceed a preferred, but non-limiting, 0.1 mm target thickness along the main runs of the perimeter seal, confining such thicker regions to the limited regions of the corner pockets 420 should allow the leak rate in the corners to be small enough to provide an overall seal leak rate which is acceptable.

Implementation and use of embodiments described herein are not limited solely to individual HDDs. Rather, embodiments involving the use of particular cover and base configurations/geometries to provide a sufficiently low-permeable cover-to-base perimeter seal, may also be applied to a system level sealed tray or box of multiple HDDs enclosed in a box containing gas like He or $N_2$.

A Method of Sealing a Hard Disk Drive with a Perimeter Adhesive Seal

Figure 5B:
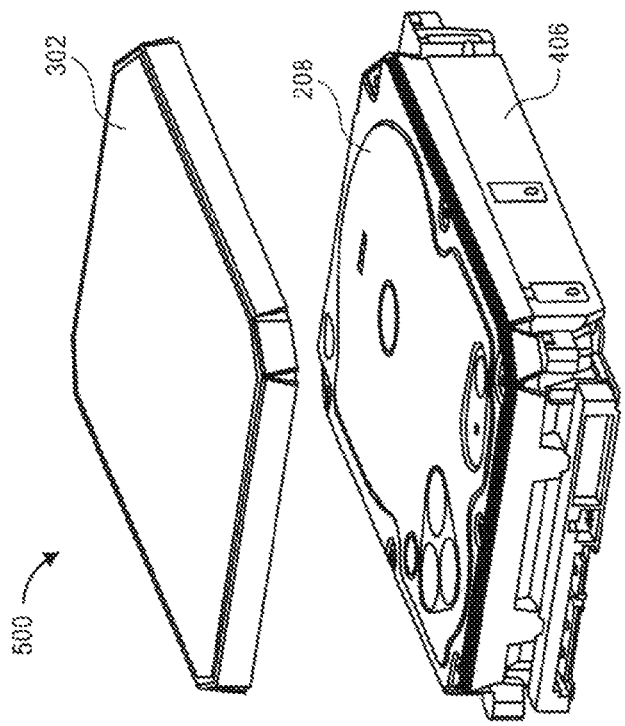
FIG. 5B is an exploded perspective view illustrating the HDD assembly of FIG. 5A, according to an embodiment.
Figure 5A:
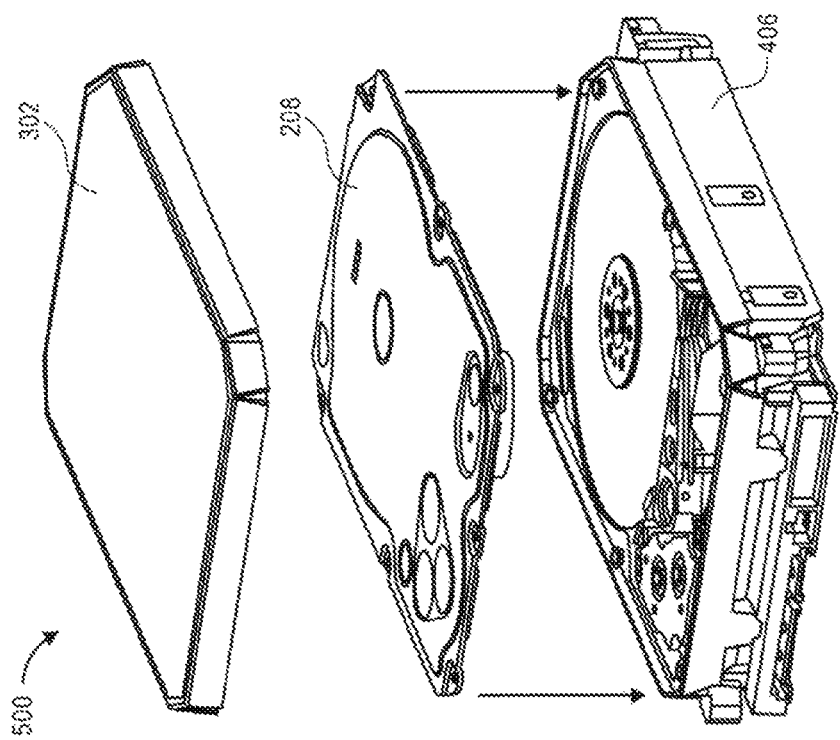
FIG. 5A is an exploded perspective view illustrating an HDD assembly, according to an embodiment.
Figure 5C:
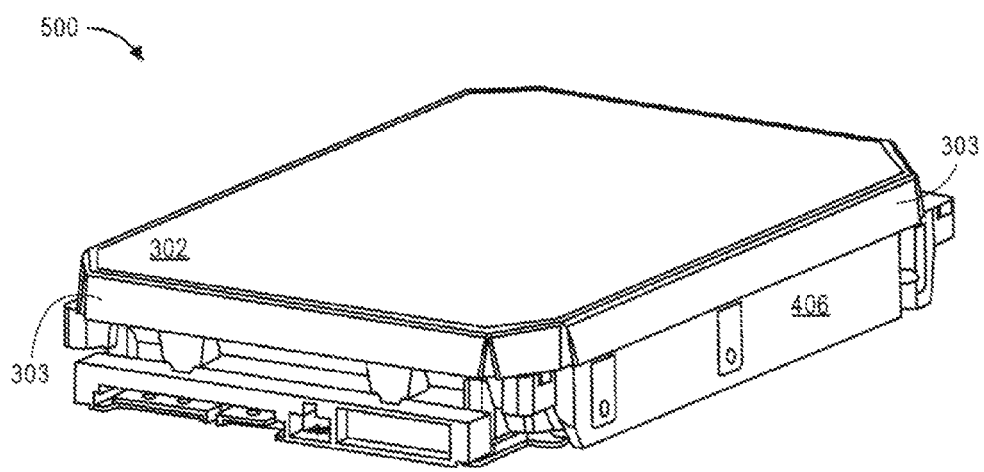
FIG. 5C is a perspective view illustrating the HDD assembly of FIG. 5A, according to an embodiment.
Figures 1, 5C:
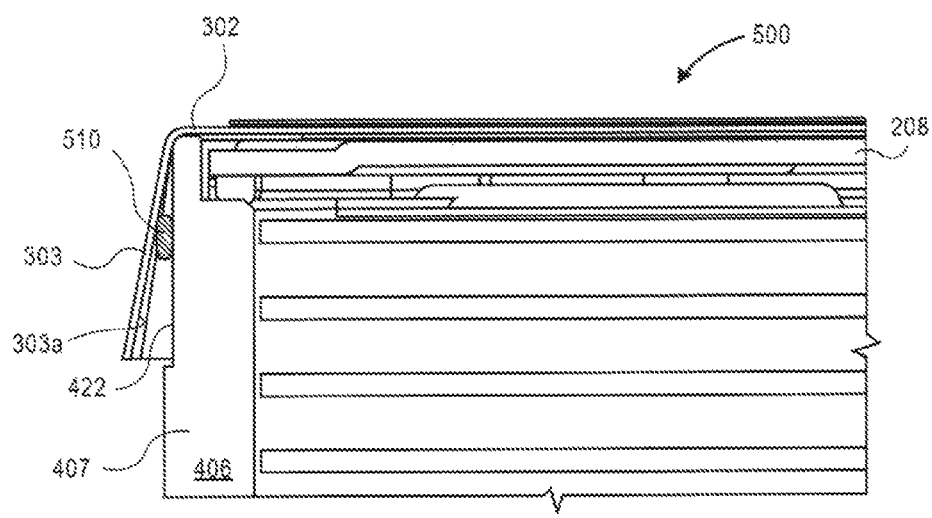
Figure 5D:
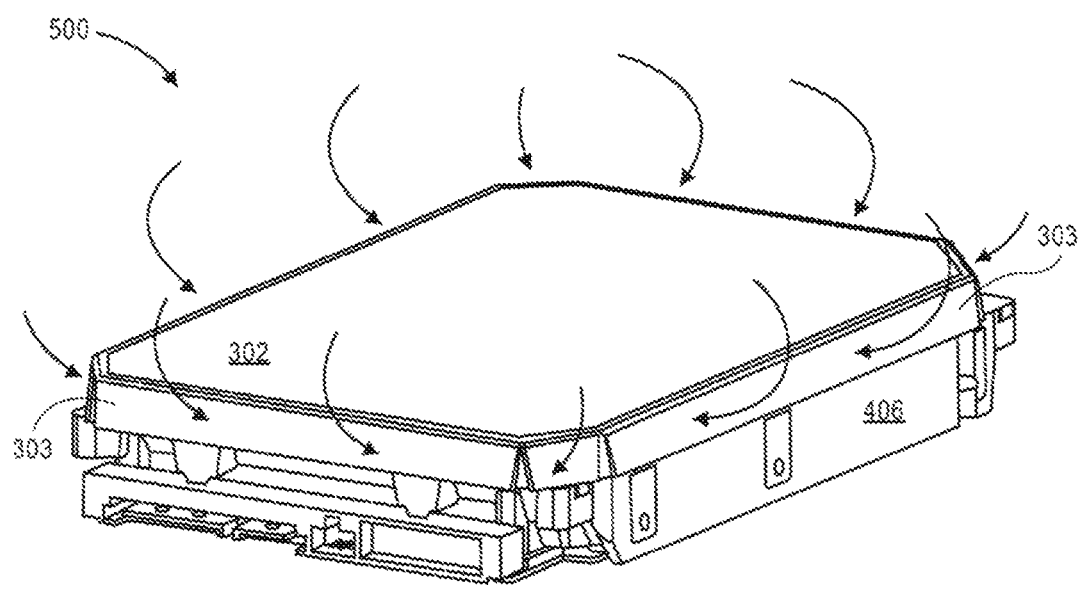
FIG. 5D is a perspective view illustrating the HDD assembly of FIG. 5A, according to an embodiment.
Figures 1, 5D:
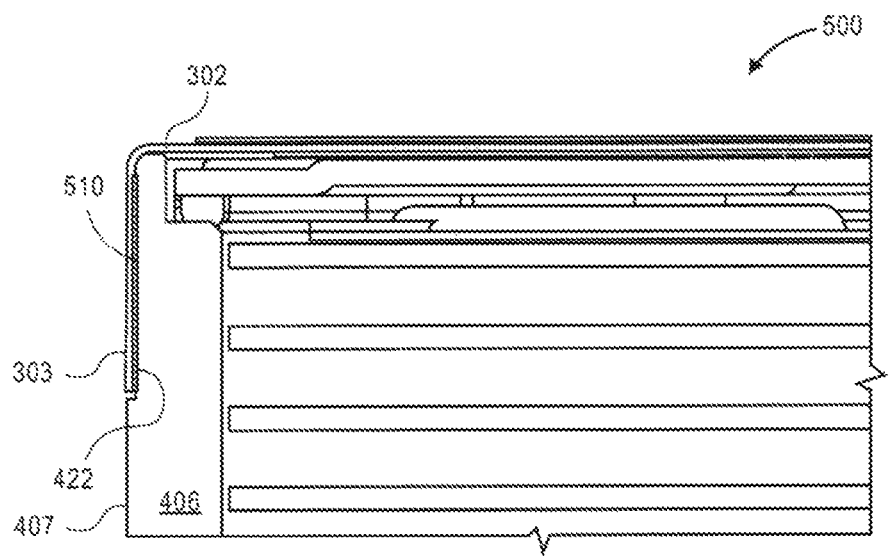

FIGS. 5A-5D visually illustrate an assembly process for sealing a hard disk drive with a perimeter seal, according to an embodiment. In particular, FIG. 5A is an exploded perspective view illustrating an HDD assembly; FIG. 5B is an exploded perspective view illustrating the HDD assembly of FIG. 5A; FIG. 5C is a perspective view illustrating the HDD assembly of FIG. 5A; and FIG. 5D is a perspective view illustrating the HDD assembly of FIG. 5A, all according to one or more embodiment.

FIGS. 5A, 5B depict HDD assembly 500 comprising an enclosure base 406 to which a first cover 208 is attached, and over which a cover 302 is positioned. FIG. 5C depicts the HDD assembly 500 with the cover 302 positioned over the first cover 208 (FIGS. 5A, 5B) and with its sidewalls 303 overlapping a portion of the base 406.

FIG. 5C-1 is a cross-sectional partial side view illustrating the HDD assembly of FIG. 5C, according to an embodiment. FIG. 5C-1 again depicts the HDD assembly 500 comprising base 406 that has a sidewall 407 having a vertical face 422. First cover 208 is shown attached to the base 406, with a partially-assembled cover 302 placed thereover. Between the vertical face 422 of sidewall 407 of base 406 and the inner surface 303a of the sloped sidewall 303 of cover 302 is placed an adhesive 510. Cover 302 is referred to as partially-assembled with the base 406 because the cover 302 sidewalls, such as sidewall 303, are not yet bent inward to physically mate with the vertical face 422 of sidewall 407.

FIG. 5D again depicts the HDD assembly 500 comprising the cover 302 with its sidewalls 303 overlapping a portion of the base 406. At this stage of the HDD assembly process for sealing a hard disk drive with a perimeter seal as visually illustrated by FIGS. 5A-5D, the curved arrows represent the action of bending inward the sidewalls 303 of cover 302 (such as at block 608 of FIG. 6). FIG. 5D-1 is a cross-sectional partial side view illustrating the HDD assembly of FIG. 5D, according to an embodiment. Bending inward the sidewalls 303 of cover 302 acts to spread the adhesive 510 between the vertical face 422 of sidewall 407 of base 406 and the inner surface 303a (FIG. 5C-1) of the sloped sidewall 303 of cover 302, as depicted in FIG. 5D-1, thereby providing a hermetic seal between the cover 302 ("second cover") and the base 406 which has a long, narrow diffusion path for inhibiting diffusion of gas through the adhesive bond between the cover 302 and the base 406.

Figure 6:
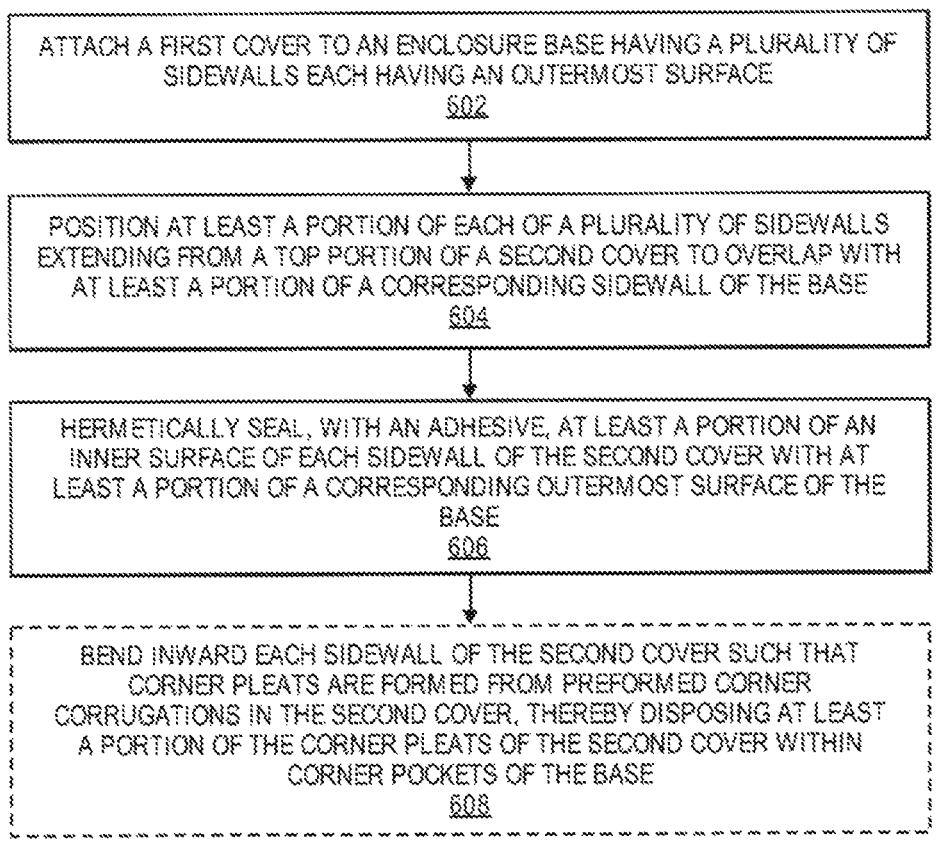
FIG. 6 is a flow diagram illustrating a method of sealing an HDD, according to an embodiment.

FIG. 6 is a flow diagram illustrating a method of sealing an HDD, according to an embodiment. The method of FIG. 6 is described with reference to FIGS. 5A-5D-1.

At block 602, a first cover is attached to an enclosure base having a plurality of sidewalls, where each sidewall has an outermost surface. For example, first cover 208 (FIGS. 5A, 5B) is attached to the base 406 (FIGS. 5A, 5B), where the base 406 comprises a plurality of sidewalls 407 (FIGS. 4A, 4B, 5C-1, 5D-1), and where each sidewall has an outermost surface such as outermost surface 207a (FIGS. 2A, 2B) or vertical surface 422 (FIGS. 4B, 5C-1, 5D-1).

At block 604, at least a portion of each of a plurality of sidewalls extending from a top portion of a second cover is positioned to overlap with at least a portion of a corresponding sidewall of the base. For example, at least a portion of each sidewall 303 (FIGS. 3A, 3B, 5C, 5C-1) of cover 302 (FIGS. 3A, 3B, 5C, 5C-1) is positioned to overlap with at least a portion of a corresponding sidewall 407 (FIGS. 4A, 4B, 5C-1) of base 406 (FIGS. 4A, 4B, 5C-1).

At block 606, at least a portion of an inner surface of each sidewall of the second cover is hermetically sealed, with an adhesive, with at least a portion of a corresponding outermost surface of the base. For example, at least a portion of inner surface 203a of sidewall 203 of the second cover 202 (FIGS. 2A, 2B) is hermetically sealed with adhesive 210 (FIGS. 2A, 2B) to at least a portion of outermost surface 207a of sidewall 207 of base 206 (FIGS. 2A, 2B). For another example, at least a portion of inner surface 303a of the sidewall 303 of the second cover 302 (FIG. 3A, 5C-1) is hermetically sealed with adhesive 510 (FIGS. 5C-1), to at least a portion of vertical surface 422 of sidewall 407 of base 406 (FIGS. 4B, 5C-1).

At optional block 608 (shown as optional with dashed box in FIG. 6), each sidewall of the second cover is bent inward such that corner pleats are formed from preformed corner corrugations in the second cover, thereby disposing at least a portion of the corner pleats of the second cover within corner pockets of the base. For example, each sidewall 303 of the second cover 302 (FIGS. 3A, 3B, 5C-1, 5D, 5D-1) is bent inward (FIG. 5D) such that corner pleats are formed from preformed corner corrugations 320 (FIGS. 3A, 3B) in the second cover 302, thereby disposing at least a portion of the corner pleats of the second cover 302 within corner pockets 420 of the base 406 (FIGS. 4A, 4B).

Implementation and use of embodiments described herein may be extended to future HDD designs, such as HDD's having larger magnetic-recording disks (e.g., 95-97 mm in diameter), an expansion in size which may lead to narrower base sidewalls in order to maintain standard form factors, which would lead to even narrower base sidewall top faces (e.g., approximately 2 mm or less) on which to weld a secondary cover.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alpha-numeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive (HDD) comprising:
    an enclosure base having a plurality of sidewalls each having an outermost surface;
    a first cover attached to said base;
    a second cover positioned over said first cover, said second cover comprising:
        a top portion, and
        a plurality of sidewalls extending from said top portion and each sidewall having an inner surface;
    wherein at least a portion of each of said sidewall of said second cover overlaps with at least a portion of a corresponding said sidewall of said base; and
    an applied adhesive bond line adhesively bonding at least a portion of said inner surface of each of said sidewall of said second cover with at least a portion of said outermost surface of each of said sidewall of said base;
    wherein at least one said outermost surface of said sidewall of said base is at a first angle from a vertical direction, and wherein at least one corresponding said inner surface of said sidewall of said second cover is at a second angle from the vertical direction.

2. The hard disk drive of claim 1, wherein said first angle and said second angle are approximately equal in a range of 5-35 degrees from the vertical direction.

3. The hard disk drive of claim 1,
wherein said applied adhesive bond line, between said portion of said inner surface of each of said sidewall of said second cover and said portion of said outermost surface of each of said sidewall of said base, has a ratio of a height and a thickness in a range between 50:1 and 100:1, thereby providing a hermetic seal between said second cover and said base having a diffusion path inhibiting diffusion of gas through said adhesive bond line.

4. The hard disk drive of claim 1, wherein said second cover comprises a plurality of preformed corner corrugations and said base further comprises a plurality of corner pockets in which corner pleats formed with the second cover corner corrugations are received when said second cover is bonded with said base.

5. The hard disk drive of claim 4, wherein said corner pockets of said base are conical.

6. The hard disk drive of claim 4, wherein said corner pockets of said base are pyramidal.

7. The hard disk drive of claim 1, wherein said second cover comprises a plurality of convex corners with increasing radii in a direction away from said top portion, and wherein said base further comprises a plurality of corner pockets in which corner pleats formed with the second cover corners are received when said second cover is bonded with said base.

8. A method of sealing a hard disk drive (HDD), the method comprising:
attaching a first cover to an enclosure base having a plurality of sidewalls each having an outermost surface;
positioning at least a portion of each of a plurality of sidewalls extending from a top portion of a second cover to overlap with at least a portion of a corresponding said sidewall of said base; and
dispensing an adhesive to hermetically seal at least a portion of an inner surface of each said sidewall of said second cover with at least a portion of a corresponding said outermost surface of said sidewall of said base;
wherein said outermost surface of each said sidewall of said base is substantially vertical, and wherein said inner surface of each said sidewall of said second cover is at an angle from a vertical direction, and wherein said second cover comprises a plurality of preformed corner corrugations and/or a plurality of convex corners with increasing radii in a direction away from said top portion and said base comprises a plurality of corner pockets, said method further comprising:
bending inward each said sidewall of said second cover such that corner pleats are formed from said corner corrugations and/or said convex corners in said second cover, thereby disposing at least a portion of said corner pleats of said second cover within said corner pockets of said base.

9. The method of claim 8,
wherein dispensing said adhesive includes creating an adhesive bond line, between said portion of said inner surface of each of said sidewall of said second cover and said portion of said outermost surface of each of said sidewall of said base, having a ratio of a height and a thickness in a range between 50:1 and 100:1.

10. The method of claim 8, wherein said corner pockets of said base are conical-shaped.

11. The method of claim 8, wherein dispensing said adhesive includes dispensing an epoxy adhesive.

12. A hard disk drive (HDD) cover comprising:
a top portion;
a plurality of sidewalls extending from said top portion and each sidewall having an inner surface at an outward angle in a range of 5-35 degrees from a vertical direction; and
a plurality of preformed corner corrugations that form corresponding pleats in response to bending said sidewalls inward.

13. A hard disk drive (HDD) enclosure base comprising:
a plurality of sidewalls each having an outermost surface; and
a plurality of corner pockets along said sidewalls and configured to receive corner pleats formed in a cover in response to mating said cover with said base;
wherein each said outermost surface is at an inward angle in a range of 5-35 degrees from a vertical direction.

14. The HDD enclosure base of claim 13, wherein said corner pockets are conical.

15. The HDD enclosure base of claim 13, wherein said corner pockets are pyramidal.

16. A hard disk drive (HDD) cover comprising:
a top portion;
a plurality of sidewalls extending from said top portion and each sidewall having an inner surface at an outward angle in a range of 5-35 degrees from a vertical direction; and
a plurality of convex corners with increasing radii in a direction away from said top portion and that form corresponding pleats when said sidewalls are bent inward.

17. A hard disk drive (HDD) comprising:
an enclosure base having a plurality of sidewalls each having an outermost surface;
a first cover attached to said base; and
a second cover positioned over said first cover, said second cover comprising:
a top portion,
a plurality of sidewalls extending from said top portion and each sidewall having an inner surface, and
a plurality of preformed corner corrugations;
wherein at least a portion of each of said sidewall of said second cover overlaps with at least a portion of a corresponding said sidewall of said base;
wherein at least a portion of said inner surface of each of said sidewall of said second cover is adhesively bonded with at least a portion of said outermost surface of each of said sidewall of said base;
wherein said base further comprises a plurality of corner pockets in which corner pleats formed with the second cover corner corrugations are received when said second cover is bonded with said base.

18. The hard disk drive of claim 17, wherein said corner pockets of said base are conical.

19. The hard disk drive of claim 17, wherein said corner pockets of said base are pyramidal.

20. A hard disk drive (HDD) comprising:
an enclosure base having a plurality of sidewalls each having an outermost surface;

a first cover attached to said base; and
a second cover positioned over said first cover, said second cover comprising:
a top portion,
a plurality of sidewalls extending from said top portion and each sidewall having an inner surface, and
a plurality of convex corners with increasing radii in a direction away from said top portion;
wherein at least a portion of each of said sidewall of said second cover overlaps with at least a portion of a corresponding said sidewall of said base; and
wherein at least a portion of said inner surface of each of said sidewall of said second cover is adhesively bonded with at least a portion of said outermost surface of each of said sidewall of said base;
wherein said base further comprises a plurality of corner pockets in which corner pleats formed with the second cover corners are received when said second cover is bonded with said base.

21. A method of sealing a hard disk drive (HDD), the method comprising:
attaching a first cover to an enclosure base having a plurality of sidewalls each having an outermost surface;
positioning at least a portion of each of a plurality of sidewalls extending from a top portion of a second cover to overlap with at least a portion of a corresponding said sidewall of said base;
wherein said positioning includes positioning each inner surface of said sidewall of said second cover, which is at an angle from a vertical direction, to mate with a corresponding said outermost surface of said sidewall of said base, which is approximately at same said angle from the vertical direction;
wherein said angle is in a range of 5-35 degrees from the vertical direction; and
hermetically sealing, with an adhesive, at least a portion of said inner surface of each said sidewall of said second cover with at least a portion of a corresponding said outermost surface of said sidewall of said base.

22. A method of sealing a hard disk drive (HDD), the method comprising:
attaching a first cover to an enclosure base having a plurality of sidewalls each having an outermost surface;
positioning at least a portion of each of a plurality of sidewalls extending from a top portion of a second cover to overlap with at least a portion of a corresponding said sidewall of said base;
wherein said outermost surface of each said sidewall of said base is substantially vertical, and wherein an inner surface of each said sidewall of said second cover is at an angle from a vertical direction, and wherein said second cover comprises a plurality of preformed corner corrugations and said base comprises a plurality of corner pockets;
bending inward each said sidewall of said second cover such that corner pleats are formed from said corner corrugations in said second cover, thereby disposing at least a portion of said corner pleats of said second cover within said corner pockets of said base; and
hermetically sealing, with an adhesive, at least a portion of Dnlisaid inner surface of each said sidewall of said second cover with at least a portion of a corresponding said outermost surface of said sidewall of said base.

23. The method of claim 22, wherein said corner pockets of said base are conical-shaped.

24. A method of sealing a hard disk drive (HDD), the method comprising:
attaching a first cover to an enclosure base having a plurality of sidewalls each having an outermost surface;
positioning at least a portion of each of a plurality of sidewalls extending from a top portion of a second cover to overlap with at least a portion of a corresponding said sidewall of said base;
wherein said outermost surface of each said sidewall of said base is substantially vertical, and wherein an inner surface of each said sidewall of said second cover is at an angle from a vertical direction, and wherein said second cover comprises a plurality of convex corners with increasing radii in a direction away from said top portion and said base comprises a plurality of corner pockets;
bending inward each said sidewall of said second cover such that corner pleats are formed from said convex corners in said second cover, thereby disposing at least a portion of said corner pleats of said second cover within said corner pockets of said base; and
hermetically sealing, with an adhesive, at least a portion of said inner surface of each said sidewall of said second cover with at least a portion of a corresponding said outermost surface of said sidewall of said base.

* * * * *